United States Patent [19]

Thompson

[11] Patent Number: 4,523,804

[45] Date of Patent: Jun. 18, 1985

[54] ARMORED OPTICAL FIBER CABLE

[75] Inventor: Robert E. Thompson, Roanoke, Va.

[73] Assignee: Chevron Research Company, San Francisco, Calif.

[21] Appl. No.: 408,975

[22] Filed: Aug. 17, 1982

[51] Int. Cl.³ .............................................. G02B 5/14
[52] U.S. Cl. ................................................. 350/96.23
[58] Field of Search ...................................... 350/96.23

[56] References Cited

U.S. PATENT DOCUMENTS

| | | | |
|---|---|---|---|
| 2,706,376 | 5/1954 | Kerr | 57/6 |
| 3,883,218 | 5/1975 | Slaughter | 350/96 B |
| 3,955,878 | 5/1976 | Nowak | 350/96 R |
| 4,039,248 | 8/1977 | Franke et al. | 350/96 B |
| 4,078,853 | 3/1978 | Kempf et al. | 350/96.23 |
| 4,093,342 | 6/1978 | Foord et al. | 350/96.23 |
| 4,113,349 | 9/1978 | Stiles | 350/96.23 |
| 4,117,300 | 9/1978 | Richards | 219/121 LM |
| 4,156,104 | 5/1979 | Mondello | 174/70 R |
| 4,158,478 | 6/1979 | Areia et al. | 350/96.23 |
| 4,162,400 | 7/1979 | Pitts | 250/256 |
| 4,166,670 | 9/1979 | Ramsay | 350/96.23 |
| 4,189,705 | 2/1980 | Pitts | 250/262 |
| 4,239,335 | 9/1980 | Stiles | 350/96.23 |
| 4,239,336 | 12/1980 | Parfree et al. | 350/96.23 |
| 4,359,598 | 11/1982 | Dey et al. | 350/96.23 |
| 4,389,645 | 6/1983 | Wharton | 340/854 |

FOREIGN PATENT DOCUMENTS

| | | |
|---|---|---|
| 2836314 | 8/1978 | Fed. Rep. of Germany . |
| 2920428 | 5/1979 | Fed. Rep. of Germany . |
| 1073958 | 5/1967 | United Kingdom . |
| 1438074 | 6/1976 | United Kingdom . |
| 2029048 | 3/1980 | United Kingdom . |
| 1598540 | 9/1981 | United Kingdom . |
| 2084757 | 4/1982 | United Kingdom . |
| 2085187 | 4/1982 | United Kingdom . |
| 2104752 | 3/1983 | United Kingdom . |
| 2088584 | 6/1984 | United Kingdom . |

OTHER PUBLICATIONS

Patent Abstracts of Japan, vol. 5, No. 202, Dec. 22, 1981.
Applied Optics, vol. 21, No. 5, Mar. 1, 1982, N. Kojima et al.
Amored Optical Cable Brochure, Optelecom, Oct. 1980.
Copperwald Bimetallics Group, Pub. No. 183-6-81.
Fiber Optic Data Transmission System for Borehole Logging, Final Report, Aug. 14, 1981, DOE Contract 78-241-S.
Evaluation of Optical Fiber Cable For Transmission Subsurface Drill Hole, Logging Data/Report on Phase 1-B, Dec. 19, 1979, (DOE 78-241-S).

Primary Examiner—William L. Sikes
Assistant Examiner—Robert E. Wise
Attorney, Agent, or Firm—S. R. LaPaglia; E. J. Keeling; A. Stephen Zavell

[57] ABSTRACT

An armored optical cable and process of manufacturing is described. The armored optical cable exhibits minimal inelastic elongation in response to tension at elevated temperatures and is capable of withstanding harsh ambient conditions. The armored optical cable is fabricated in a unitary operation with a central bundle of one handedness surrounded by at least one outer armor layer of opposite handedness substantially torque balanced to the handedness of the central bundle.

37 Claims, 1 Drawing Figure

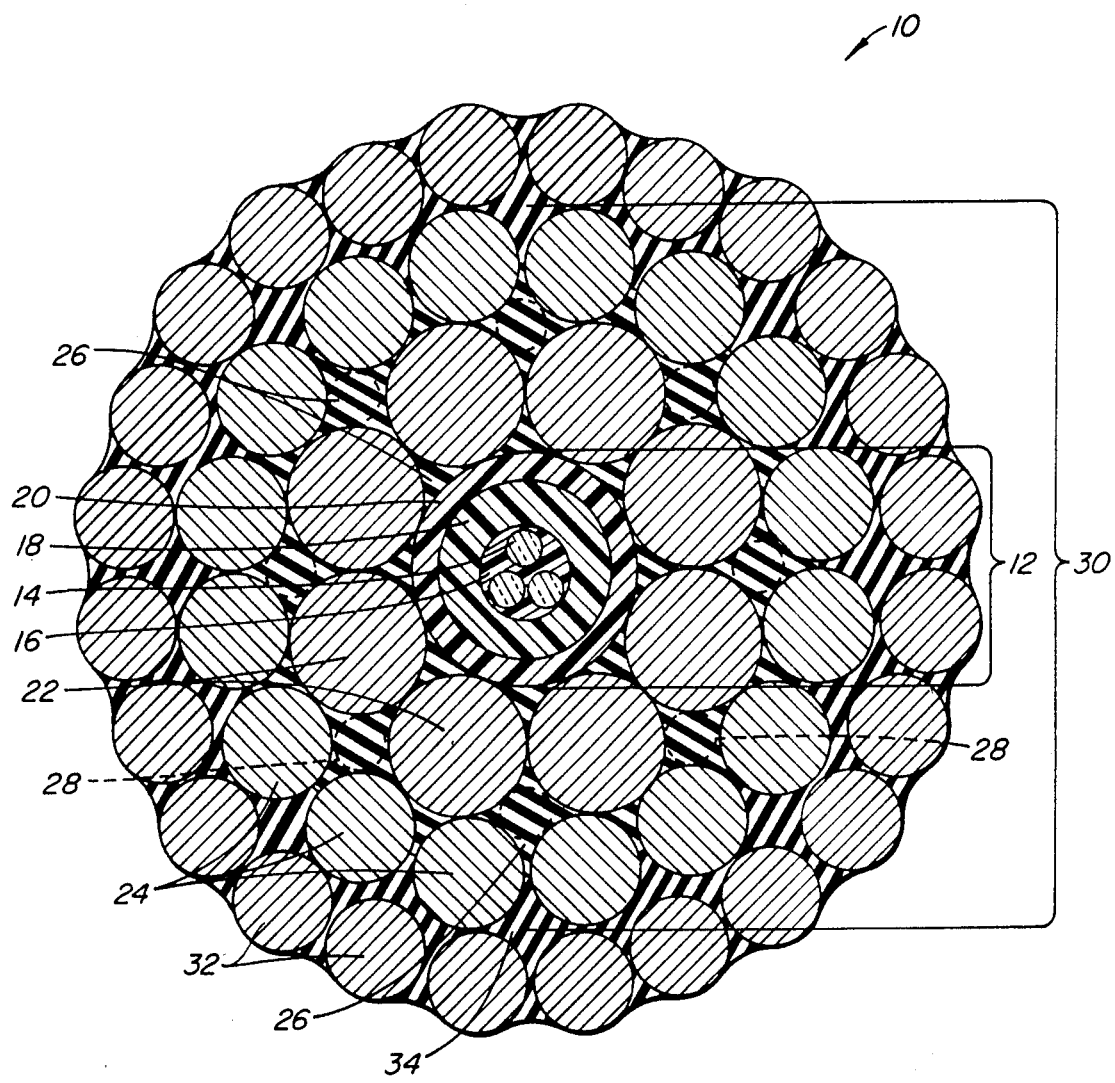
FIG._1.

ARMORED OPTICAL FIBER CABLE

This invention relates to armored cables. More specifically, this invention relates to armored optical fiber cables.

BACKGROUND OF THE INVENTION

Conventional electromechanical cables for oil well logging include insulated metal conductors for the transmission of electrical signals. Such cables have signal transmission bandwidths that are limited to about 100 KHz over lengths that correspond to typical depths of oil wells, 12,000 to 20,000 feet. Much of the information that is obtainable with modern logging tools is not retrievable from down the well bore due to the restricted signal bandwidth that is characteristic of state-of-the-art conventional logging cables. Consequently, a need exists to provide oil well logging cables that have substantially higher signal transmission bandwidths. Optical fibers can provide signal transmission bandwidths one to three orders of magnitude higher than the insulated wires that are used in conventional well logging cables.

Glass optical fibers have two properties which make it difficult to successfully incorporate them into strain cables. These properties are static fatigue degradation and microbending loss.

Silica glass fibers have small cracks (microcracks) on their surface. The depth of these microcracks can increase through a stress-accelerated chemical reaction between the silica glass and moisture, called static fatigue. The tensile strength of the glass fiber decreases substantially as the microcracks increase in depth. Glass is an elastic material with a high Young's modulus. Strain in a glass optical fiber generates tensile stress and results in static fatigue. Thus, glass optical fibers are not suitable for use under high strain ($>0.5\%$) in the presence of moisture over extended periods of time.

Optical fibers transmit light signals by the principle of total internal reflection. This principal depends upon the light rays being totally reflected back into the core region each time they impinge upon the core to cladding interface of the optical fiber. Total internal reflection can only occur when the angle of incidence between the rays and the core to cladding interface is below a certain critical value. Bending of an optical fiber causes some of the light which is propagating in the fiber core to impinge upon the core to cladding interface at angles of incidence greater than the minimum value and to be refracted out of the optical core and lost. The amount of the light that is lost becomes greater as the effective diameter of the bend becomes smaller. When the bending of the optical fiber is caused by deflection due to local lateral forces, the resulting decrease in signal strength is called microbending loss. When an optical fiber is deflected by a local inhomogeneity, such as a lamp in its coating layers, the effective diameter of the bend depends upon the local strain the fiber is under. Generally, the fiber will bend to a smaller effective diameter as the strain level it is under increases. Consequently, higher strain levels result in higher levels of microbending loss.

A necessary condition for accurate logging of a well bore is an accurate knowledge of the position of the logging tool within the well bore. The position of the tool is defined by the actual length of logging cable that is suspended in the well bore. The actual length of suspended cable can be determined from a knowledge of the amount of unstressed cable length that has been lowered into the well plus a knowledge of the elongation versus tension characteristics of the cable and the tension along the suspended cable length. The amount of unstressed cable length that has been lowered into the well bore can be precisely measured. The tension profile along the suspended length of cable can be accurately calculated. Therefore, the actual length of cable suspended in the well can be accurately determined if the elongation versus tension characteristics of the cable are accurately known and are repeatable.

Conventional electromechanical cables for well logging can be constructed to withstand harsh high temperature environments and to accept high levels of axial strain while still remaining functional. More specifically, for example, each conductor element in a conventional logging cable comprises a bundle of copper wires. The copper wires yield inelastically at low strain. When the cable is alternately stretched and relaxed, the copper does not fully return to its original state and eventually the copper wires become brittle, due to strain hardening, and break. However, even this serious condition does not necessarily render the cable inoperable because a break in one or more wires with adjacent non-broken wires permits the current to be passed to the neighboring wires and thus the conductor still appears whole and the cable remains functional. Thus, conventional logging cables can withstand considerable inelastic and elastic strain and still remain functional.

Well logging cables are generally constructed with two layers of external steel armor wires. The armor wires are preformed and applied in helices of opposing handedness to prevent the cable from unwinding when supporting a free hanging load. Inside the armored jacket can be seven insulated copper conductors laid six around one in helices generally of opposite handedness to those of the steel wires in the inner armor layer. However, there is no definite relationship between the helices of the copper conductors and those of the inner armor wires since they are added in separate fabrication steps and usually with a bedding layer of a pliant material therebetween. A result of this conventional cabling geometry is that the interface between the inner armor wires and the underlying insulated conductors consists of a multiplicity of cross-over points separated by the pliant bedding material.

When a conventional well logging cable is tensioned at elevated temperatures, it will elongate by an amount which is not acurately predictable. This is because the elongation consists of two parts, one that is linear and one that is highly nonlinear and inelastic. The inelastic part occurs because the armor wires inelastically deform the underlying compliant bedding and the wire insulation, due to very high local stresses at the cross-over points, and take on a smaller pitch diameter. The inelastic part of the cable elongation is not very predictable or repeatable and consequently the position of the logging probe will not be accurately known.

In order to prevent inelastic strain from occurring in use, conventional logging cables are given a hot prestretch during fabrication. When properly conducted, the hot prestretch operation will result in a cable that exhibits a linear and elastic elongation in response to tension. The hot prestretching operation imparts a permanent (inelastic) strain of between $\frac{3}{4}$ to $1\frac{1}{4}$ percent to conventional seven-conductor logging cables. Hot prestretching of a conventionally designed armored cable containing one or more optical fibers within its core would leave the glass optical fibers under a permanent elongation of ¾ to 1¼ percent. Optical fibers in cables subjected to these high permanent strain levels would soon fail from static fatigue and/or exhibit intolerably high microbending losses. It is apparent that conventional prestretching technology cannot be applied to armored optical fiber cables. Thus, it would be highly desirable to have an armored fiber optic cable which overcomes these and other difficulties and permits the expansion of optical fiber communications technology into areas of harsh environments.

SUMMARY OF THE INVENTION

I have invented a cable and method of fabrication which minimizes the inelastic part of the cable elongation by minimizing the deformability of the core. The central bundle of the cable comprises at least two inner layers, including the inner armor, which are stranded in a "unilay" configuration of a given handedness around a central element. A "unilay" configuration is defined as a cable bundle wherein the element is in continuous contact with, and in the same orientation with respect to its nearest neighbors. The central bundle contains at least one optical fiber. The cross-sections of the central bundle are identical at every point along the cable, except for a rotation about the central axis. The unilay construction distributes the transverse forces continuously along the touching components instead of concentrating the forces at crossover points as in contrahelically formed layers of cable elements or layers of unidirectionally cabled elements that have different lay lengths. The lay length of the cable is long, on the order of about 3.5 inches for a cable with an outside diameter of about 0.5 inch. The lay length should be increased in direct proportion as the diameter of the cable increases. "Lay length" is defined as the distance along the cable or helical axis traversed by one complete helical revolution of the element. The cable has at least one outer armor layer which is contrahelically wound around the central bundle. The outer armor layer is of opposite handedness to the central bundle and substantially balances the torque of the inner armor when the cable is under tension. The elements of the layers are hard and resistant to deformation. This means that any conductor elements contained in the cable are single metal conductors and not multifilament conductors.

The layers in the central bundle are fabricated in a single operation with the same lay length and with the same handedness. The outer armored layer of opposite handedness is applied directly over the central bundle.

BRIEF DESCRIPTION OF THE DRAWING

FIG. 1 illustrates a cross-sectional view of an armored optical fiber cable.

DETAILED DESCRIPTION OF THE INVENTION

The invention will be more clearly illustrated by referring to FIG. 1. FIG. 1 illustrates an armored optical cable 10 of my invention. The armored optical cable 10 will be described with respect to specific embodiments such as overall size, dimensions and materials used to fabricate a well logging cable which comes within the scope of the invention. However, the invention is not intended to be limited solely to the specific dimensions or materials used in the description nor to only well-logging applications. The described cable is useful in any application which requires minimum cable deformations under load.

The armored optical cable 10 has a central core 12. The central core 12 has an outer diameter of about 0.120 inches ±1%. The central core comprises one or a plurality of optical fibers 14. The optical fibers 14 can be single-mode or multimode fibers, or mixtures thereof. The optical fibers are surrounded by a cushioning material, for example, silicon elastomers and the like. If the central core comprises a plurality of optical fibers, the optical fibers should preferably be stranded together with the same helical handedness as the elements 22 and the inner armor wires 24 of the central bundle 30. For example, the three fibers illustrated have a right-handed lay sense and about a 3.5 inch lay length (1.2° lay angle). In the illustrated embodiment, the three-fiber assembly is embedded in and surrounded with a compliant, resilient material 16 such as silicone RTV. The coated fibers are further coated with a hard, stiff jacket 18 of a material such as a fiberglass-epoxy matrix. The jacket 18 has an outer diameter of about 0.094 inches ±2%. A suitable glass-epoxy jacket material is fabricated under the name of Stratoglas ®, a product of the Air Logistics Corporation of Pasadena, Calif.

Surrounding the hard, stiff jacket 18 is an outer jacket 20 of material such as polyvinylidene (Kynar ®, a product of the Pennwalt Company), perfluoroalkoxy (PFA Teflon ®, a product of the DuPont Corporation), polyetheretherketone, (PEEK ®, a product of ICI), or similar material. The outer jacket 20 should be of a sufficient thickness so that the central core 12 has the appropriate outer diameter of about 0.120 inches ±1%.

Alternatively, the cable 10 would have a central core 12 of a gas pressure tight type cable of the appropriate diameter illustrated in U.S. Pat. No. 4,312,565, incorporated herein by reference. Another alternative is to have a central metal tube of the appropriate diameter with one or more optical fibers therein.

In the preferred embodiment, the space for the central core 12 is formed by at least six elements 22, such as conductor strands, layed around the central core 12 with a right-handed lay sense and a 3.5 inch lay length (9.8° lay angle). To obtain a larger diameter for the central core 12, more conductor strands, e.g., eight, as illustrated, are used to fabricate the space for the central core 12. The conductor strands 22 should be fabricated from material which minimizes deformation and is capable of interlocking with the inner armor 24. Suitable conductor strands are solid copper-plated steel wire having a diameter of about 0.0403 ±1%. The conductor strands should have a minimum conductivity of 60% minimum of International Annealed Cooper Standard (IACS) with a yield strain of about 0.9% minimum at 0.2% offset. A material meeting these requirements is Copperweld ®. The solid copper-plated steel wire is coated with an insulator such as Kynar ® to an outer diameter of about 0.071 inches. The central core 12 and the conductor strands 22 should have a combined outer diameter of about 0.262 inches.

An alternative embodiment is to fabricate the cable with a solid central core 12 having about 0.120 inches O.D. ±1% with a conductivity of 30% minimum of IACS, and a yield strain of about 0.9% minimum at 0.2% offset. In this embodiment, the elements 22 contain several central optical fibers surrounded with a suitable protective jacket. A suitable element 22 has a central optical fiber with about a 125 micron diameter with the silicon RTV coating it to a thickness of about 325 microns O.D. and with a Hytrel ®, a product of Du Pont, coating to an O.D. of about 500 microns ±5%. A suitable glass optical fiber meeting these requirements can be purchased from ITT Corporation. A glass-epoxy matrix is applied over this optical fiber to an O.D. of about 0.040 inches ±2% and Kynar ® or other suitable coating is applied over the glass-epoxy matrix to an O.D. of about 0.071 inches ±1%. Assuming eight elements 22, up to three of the elements would be the optical fibers and the other elements are conductor strands such as Copperweld ®. Preferably, the optical fibers are integrated among the eight elements.

At least twice the number of inner armor wires 24 surround the conductor strands 22. In this preferred embodiment, sixteen inner armor wires 24 should be of a drawn, galvanized, improved plow steel rope wires (AISI) or other suitable material with a diameter of about 0.0575 inches ±1%, minimum tensile strength of about 244 KPSI minimum torsions (8") of about 39, a coating adherence as evidenced by a 3D mandrel wrap test. The inner armor wires 24 are layed as part of the central bundle 30 with a right-handed lay sense and a 3.5 inch lay length (15.5° lay angle). The central bundle 30 has an outside diameter of about 0.368 inches. It is important that the sixteen inner armor wires 24 be electro-galvanized with bright and smooth finishes such as a minimum zinc coating of about 0.2 oz./ft.$^2$. The inner armor wires 24 lie adjacent to the insulated conductors and hence must provide a smooth interface for transferring compressive loads to the insulated wires.

A suitable protective material 26 for the intended environment of the cable 10 is applied during the fabrication of the central bundle 30 out to the inner armor 24. Suitable materials for a well logging cable are nitrile rubber based filling compounds and the like. The inner armor wires 24 are wound around the conductor strands 22 as illustrated to provide room for eight intersticial elements 28. The eight intersticial elements 28 are optional and can be either a corrosion inhibitor lubricant 26, such as TMS 5878 Compound, a product of Quaker Chemical Company, or wires or insulated conductors or jacketed optical fibers. The intersticial elements 28 are layed with the same lay sense as conductor strands 22 and inner armor wires 24. The intersticial elements 28 are cabled with a right-handed lay sense and a 3.5 inch lay length (12.5° lay angle). The intersticial elements 28 must have a maximum outside diameter of about 0.028 inches minimum zinc coating of about 0.1 oz./ft$^2$, minimum tensile strength of about 251 KPSI, minimum torsions (8") of about 83, and a coating adherence as evidenced by 2D mandrel wrap test. If the intersticial elements 28 are used to control the placement of the inner armor wires 24, then the elements 28 should preferably be solid, bright, galvanized wires. It is important that any intersticial elements 28 have a rounded and smooth external surface since they lie adjacent to the insulated conductor strands and must provide a smooth surface for transferring compressive loads to the insulated strands.

A unique feature of the armored optical cable 10 is the fact that the elements of the central bundle 30 are fabricated with the same lay length and handedness so that they nestle together and do not crossover each other. Another unique feature is the fact that the conductor strands 22 and the inner armor wires 24 are assembled in the same operation so that the elements 22 and 24 rest on each other and not in the grooves formed between the conductor strands 22. This construction gives the cable greater flexibility and reduces friction between the conductor strands 22 and the inner armor wires 24. These features provide for minimal deformation of the interface between the elements and hence minimal inelastic elongation of the cable.

Surrounding the inner armor wires 24 and forming the outside diameter of the cable 10 is at least one layer of outer armor wires. Illustrated in the preferred embodiment are twenty-four strands of outer armor wires 32. The outer armor wires 32 should be fabricated from galvanized, improved plow steel rope wires (AISI) or other suitable materials having about a 0.049 diameter ±1%, minimum zinc coating of about 0.4 oz./ft.$^2$, test per ASTM A-90, minimum tensile strength of about 246 KPSI, test per ASTM E-8, minimum torsions (8") of about 47, test per FED SPEC RR-W-410, and an adherence coating meeting ASTM A-641 using a 3D mandrel. The wires 32 are preferably preformed and layed with a lay sense opposite that of elements 22 and 24. The outer armor must be wound in opposite handedness to the inner armor and of sufficient compressive strength such that the inner armor and the outer armor are substantially torque balanced. For this example, the lay handedness of the outer armor wires 32 should be a left-handed lay sense and a 3.5 inch lay length (20.5° lay angle). As the outer armor wires 32 are being applied, the central bundle 30 is coated with a corrosion-resistant and lubricating material 34 such as TMS5878, and the like. The overall dimensions of the optical cable 10 will be about 0.469 inches.

The preferred armored optical cable 10 described herein is fabricated in one in-line operation. The central bundle 30 is formed from one bay of planetary bobbins and the outer armor wires 32 are applied directly over the central bundle 30 from a tandem bay of planetary bobbins. The outer armor wires 32 are applied in an opposite handedness such that the torques exerted by said inner and outer armor wires are substantially balanced. A suitable method of balancing the contrahelically wound outer armor wires 32 and the inner armor wires 24 is disclosed in U.S. Pat. No. 4,317,000, completely incorporated herein by reference. The machines which fabricate the cable of my invention are known in the art as planetary cabling machines. A suitable source for the fabrication of the cable is Blake Wire and Cable Company of Torrence, Calif. Of course, the cable can also be fabricated by a tube winder cabling machine; however, the outer armor wires will have to be applied in a separate step.

Having described my invention with respect to a particularly preferred embodiment and some preferred alternatives, it should be understood that the invention is not intended to be limited solely to the description therein. Modifications which would be obvious are intended to be within the scope of the invention. For example, the cable is not limited to any specific diameter, number of optical fibers, and the like. A different environment or job application which required a larger load placed on the cable could require a larger diameter cable with larger and/or more conductor strands, inner armor wires, in direct proportion. Furthermore, it is necessary that the conductor strands and the inner armor are fabricated in one operation with the same handedness and the inner armor is set up so as not to lie in the grooves formed by the conductor strands. The outer armor must be wound in opposite handedness to the inner armor and of sufficient compressive strength such that the inner armor and the outer armor are substantially torque balanced.

What is claimed is:

1. An armored optical cable suitable for use in an environment which subjects said cable to repeated longitudinal elongation and relaxation forces, said cable comprising:
   a substantially non-deformable central core element;
   at least six substantially solid elements would helically around said central element in a given handedness;
   at least twice the number of said at least six elements of inner armor wires wound around and contacting said at least six elements of the same handedness in a unilay helical configuration, said at least six elements and said inner armor wires being fabricated around said central core element at the same time wherein the elements and the wires of the same handedness and the central core element form a central bundle, said central bundle containing at least one jacketed optical fiber; and
   a plurality of outer armor wires contacting said inner armor wires, said outer armor wires wound in an opposite helical handedness to the handedness of said inner armor wires such that the torques exerted by said inner armor wires and said outer armor wires are substantially balanced.

2. The cable according to claim 1 wherein the central core element comprises a plurality of helically wound optical fibers embedded in a cushioning material and coated with a jacket of a hard, resilient material.

3. The cable according to claim 2 wherein the hard, resilient material is selected from the group consisting of polyvinylidene, perfluoralkoxy, and polyetheretherketone.

4. The cable according to claim 2 wherein the hard, resilient material is polyvinylidene extruded over a glass-epoxy layer coating the optical fibers embedded in said cushioning material.

5. The cable according to claims 1 or 4 wherein said at least six elements are solid conductor strands of a copper-plated steel wire conductors.

6. The cable according to claim 5 wherein said central core, said at least six elements, inner armor wires, and said outer armor wires are substantially round.

7. The cable according to claim 5 wherein the inner armor wire is galvanized steel wire.

8. The cable according to claim 6 wherein the conductor strands and the inner armor wires form substantially uniform in size interstitial spaces therebetween, said interstitial spaces are occupied by jacketed optical fibers, galvanized steel wire fillers, insulated conductors, or a corrosion inhibitor lubricant.

9. The cable according to claim 8 wherein the central core element, conductor strands, and inner armor wires are coated with a nitrile rubber-based filling compound.

10. The cable according to claim 11 wherein the central core element, conductor strands, and inner armor wires are coated with a nitrile rubber-based filling compound and said conductor strands are insulated.

11. The cable according to claim 8 wherein the outer armor wires are galvanized, preformed, plough steel wires and the central core element is a solid wire.

12. The cable according to claim 1 wherein the central core element, conductor strands and inner armor wires are coated with a nitrile rubber based filling compound.

13. The cable according to claim 1 wherein the central core is a solid wire and said at least six elements are eight elements, said eight elements comprise from one to three jacketed optical fibers interspaced among said elements and said other elements are insulated copper-plated steel wire conductors.

14. The cable according to claim 1 wherein said at least six elements are solid conductor strands of an insulated copper-plated steel wire conductor and said central core element is a metal tube containing at least one optical fiber.

15. An armored optical well logging cable comprising:
    a substantially non-deformable and round central core element having an outer diameter of about 0.120 inches, said central core element comprising a plurality of optical fibers embedded in elastomer and coated with a hard, resilient material;
    eight substantially round and insulated solid conductor strands wound around and contacting said central core with a right hand lay and about a 3.5-inch lay length and a diameter of about 0.071 inches such that the outer diameter of said central core element and said conductor strands is about 0.262 inches;
    sixteen substantially round inner armor wires of galvanized steel wire having an outer diameter of about 0.058 inches wound around and contacting said conductor strands in the same handedness and lay length as said conductor strands, said conductor strands and said inner armor wires being fabricated in the same operation, wherein said central core element, said conductor strands and said inner armor wires form a central bundle having an outer diameter of about 0.368 inches; and
    twenty four substantially round outer armor wires of glavanized steel wire wound around and contacting said inner armor wires in a left hand lay with a 3.5-inch lay length, said outer armor wires having a diameter of about 0.049 inches such that the total cable diameter has an outside diameter of about 0.469 inches and said inner and outer armor wires are substantially torque balanced.

16. The cable according to claim 15 wherein the central bundle is filled with an elastomeric filling compound.

17. The cable according to claim 16 wherein the interstices formed between said inner armor strands and outer armor wires are filled with a corrosion inhibitor and lubricant.

18. The cable according to claim 17 wherein the eight interstices formed between said inner armor wires and said conductor strands are occupied by eight substantially round wire filler elements, said wire filler elements having a maximum diameter of about 0.028 inches.

19. A process of forming an armored optical fiber cable comprising:
    applying a central core element;
    winding conductor elements helically around said central core elment, said winding is of a given handedness and lay length;
    winding a layer of inner armor wires of the same handedness as said conductor elements and with the same lay length and applied at the same time as said conductor elements helically around said conductor elements; and fabricating a layer of outer armor wires of opposite handedness to said layer of inner armor wires and with such a lay length that the torques extended by said inner and outer armor are substantially balanced when the cable is under tension.

20. The process according to claim 19 wherein the fabrication further comprises laying down cable elements in the intersticial space formed between said conductor elements and said layer of inner armor wires at the same time as said conductor elements and said layer of inner armor wires are being formed.

21. In a method of well logging to obtain data about an earth formation surrounding a well bore wherein one end of an optical fiber is connected to a surface transmitter/receiver and the end opposite thereto is connected to an instrument for measuring and transmitting data about the earth formations through said optical fiber to the transmitter/receiver during the lowering and raising of the instrument in the well bore, the improvement comprising:
  transmitting said data through an armored optical fiber cable which comprises: a substantially non-deformable center core element; at least six substantially solid elements helically wound around said central element in a given handedness; at least twice the number of said at least six elements of inner armor wires wound around and contacting said at least six elements of the same handedness in a unilay helical configuration, said at least six elements and said inner armor wires being fabricated around said central core element at the same time wherein the elements and the wires of the same handedness and the central core form a central bundle, said central bundle containing at least one jacketed optical fiber; and a plurality of outer armor wires contacting said inner armor wires, said outer armor wires wound in an opposite helical handedness to the handedness of said inner armor wires such that the torque exerted by said inner armor wires and said outer armor wires are substantially balanced, and
  transmitting electrical power or signals through said at least six elements.

22. The process according to claim 21, wherein the data is transmitted through a plurality of helically wound optical fibers embedded in a cushioning material and coated with a jacket of a hard resilient material, said optical fibers cushioning material and jacket forming the substantially non-deformable central core element and said electrical power or signals is transmitted through insulated copper-plated steel wire conductors.

23. The process according to claim 22 wherein the data is transmitted through the optical fibers of said armored optical fiber cable which further incorporates wire control elements located in the interstices between said inner armor wires and said at least six elements.

24. An armored optical fiber cable suitable for use in an environment which subjects said cable to repeated longitudinal elongation and relaxation forces, said cable comprising:
  a central core containing at least one optical fiber;
  a plurality of insulated conductor elements wound helically around said central core in a given handedness and lay length;
  a plurality of inner armor wires wound around and substantially continuously contacting adjacent insulated conductor elements, said inner armor wires having the same handedness and lay length as said insulated conductor elements; and
  a plurality of torque balancing outer armor wires wound around said outer armor wires in an opposite helical handedness to the handedness of said inner armor wires.

25. The armored optical fiber cable of claim 24 further characterized in that said insulated conductor elements are substantially solid and include a layer of electrically conductive material attached to a body of different material having a yield strength under tension substantially higher than that of said electrically conductive material.

26. The armored optical fiber cable of claim 25 further characterized that the inner armor wires are smooth so as to provide a smooth interface for transferring compressive loads to said insulated conductor elements.

27. The armored optical fiber cable of claim 26 where said inner armor wires are electro-galvanized steel wires.

28. The armored optical fiber cable of claim 27 where said central core is substantially non-deformable across the cross-section thereof.

29. An armored optical fiber cable suitable for use in well logging which subjects said cable to repeated longitudinal elongation and relaxation forces, said cable comprising:
  a central core formed to be substantially non-deformable across the cross-section thereof;
  a plurality of substantially solid insulated conductor elements wound helically around said central core in a given handedness and lay length, said solid insulated conductor elements being disposed in and substantially filling a first annular ring at any given cross-section along the length of said cable;
  a plurality of inner armor wires wound around said insulated conductor elements, said inner armor wires having the same handedness and lay length as said insulated conductor elements, said inner armor wires being disposed in and substantially filling a second annular ring concentric with said first annular ring at any cross-section along the length of said cable, each of said inner armor wires resting on an adjacent insulated conductor element and not in the grooves formed between adjacent insulated conductor elements to provide said cable with flexibility and to reduce friction between said insulated conductor elements and said inner armor wires, said central core, said insulated conductor elements and said inner armor wires forming a central bundle;
  at least one optical fiber in said central bundle extending substantially the length of said cable; and
  a plurality of torque balancing outer armor wires wound around said inner armor wires in an opposite helical handedness to the handedness of said inner armor wires, said outer armor wires being disposed in and substantially filling a third annular ring generally concentric with said second annular ring at any given cross-section along the length of said cable.

30. The armored optical fiber cable of claim 29 further characterized in that said at least one optical fiber is contained in said central core.

31. The armored optical fiber cable of claim 29 further characterized by the presence of at least six of said insulated conductor elements.

32. The armored optical fiber cable of claim 29 characterized by the presence of at least twelve of said inner armor wires.

33. The armored optical fiber cable of claim 32 characterized in that the said optical fiber is contained in said core.

34. The armored optical fiber cable of claim 29 further characterized by the presence of interstitial elements located in said grooves formed between adjacent ones of said insulated conductor elements to control the placement of the inner armor wires.

35. The armored optical fiber cable of claim 34 characterized in that said interstitial elements are smooth bright galvanized wires.

36. The armored optical fiber cable of claim 35 further characterized in that the inner armor wires are electro-galvanized steel wires.

37. The armored optical fiber cable of claim 34 further characterized in that said insulated conductor elements include a layer of electrically conductive material attached to a body of different material having a yield strength under tension substantially higher than that of said electrically conductive material.

* * * * *